Oct. 28, 1969  H. HESSNER  3,474,592
MACHINE FOR PRODUCING AND PACKAGING DIAPERS
Filed April 8, 1968  10 Sheets-Sheet 2

INVENTOR
HANS HESSNER

BY Wendoroth, Lind & Ponack
ATTORNEYS

INVENTOR
HANS HESSNER

BY Wenderoth, Lind & Ponack
ATTORNEYS

Oct. 28, 1969  H. HESSNER  3,474,592
MACHINE FOR PRODUCING AND PACKAGING DIAPERS
Filed April 8, 1968  10 Sheets-Sheet 4

INVENTOR
HANS HESSNER

BY *Wenderoth, Lind & Ponack*
ATTORNEYS

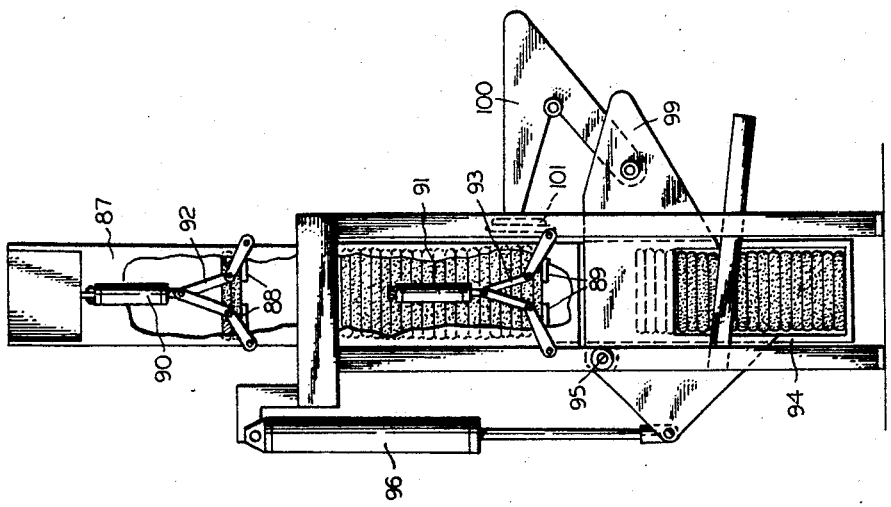
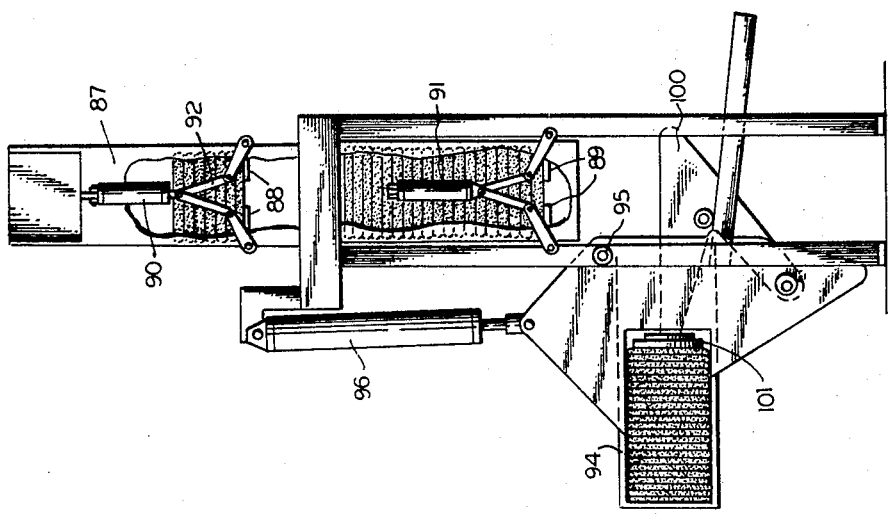

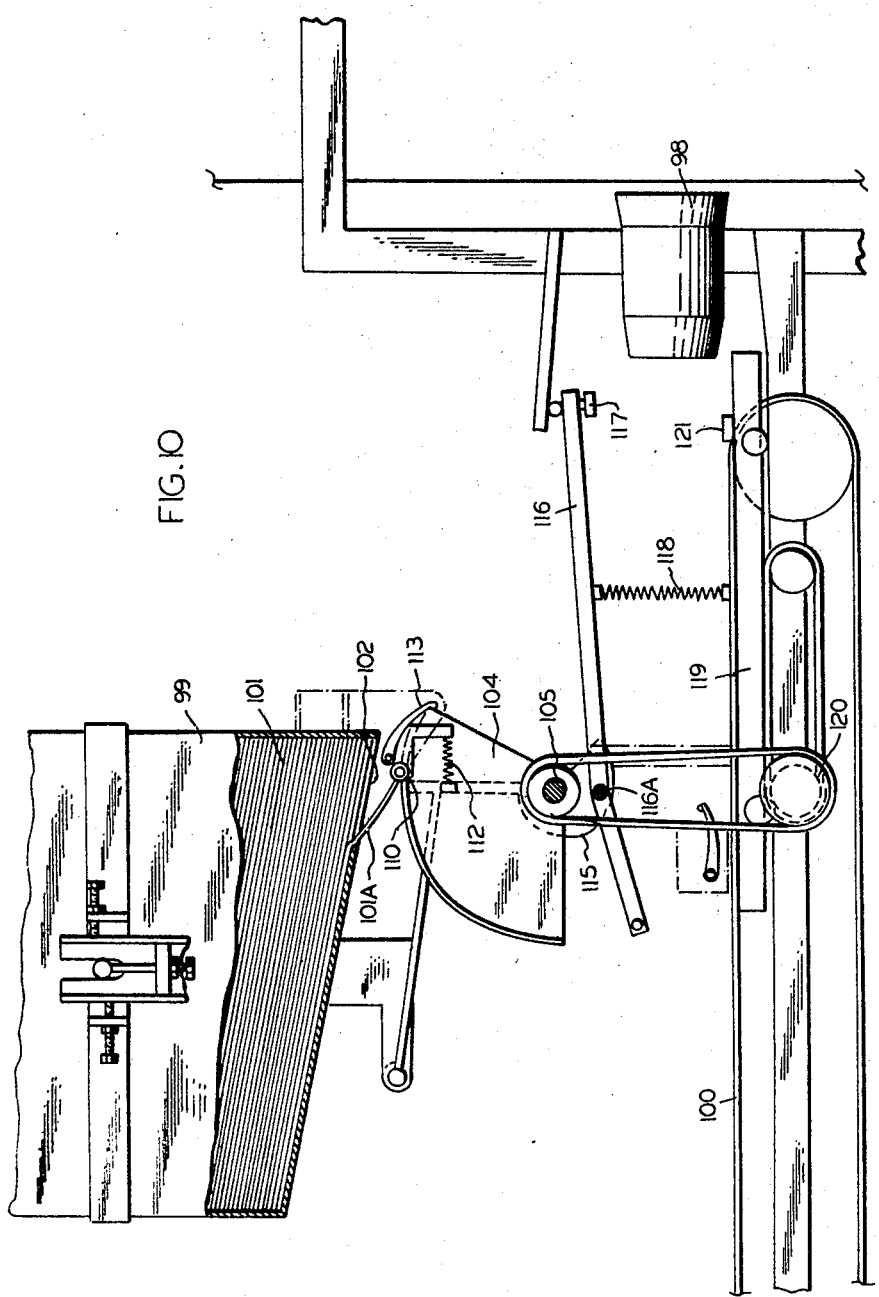

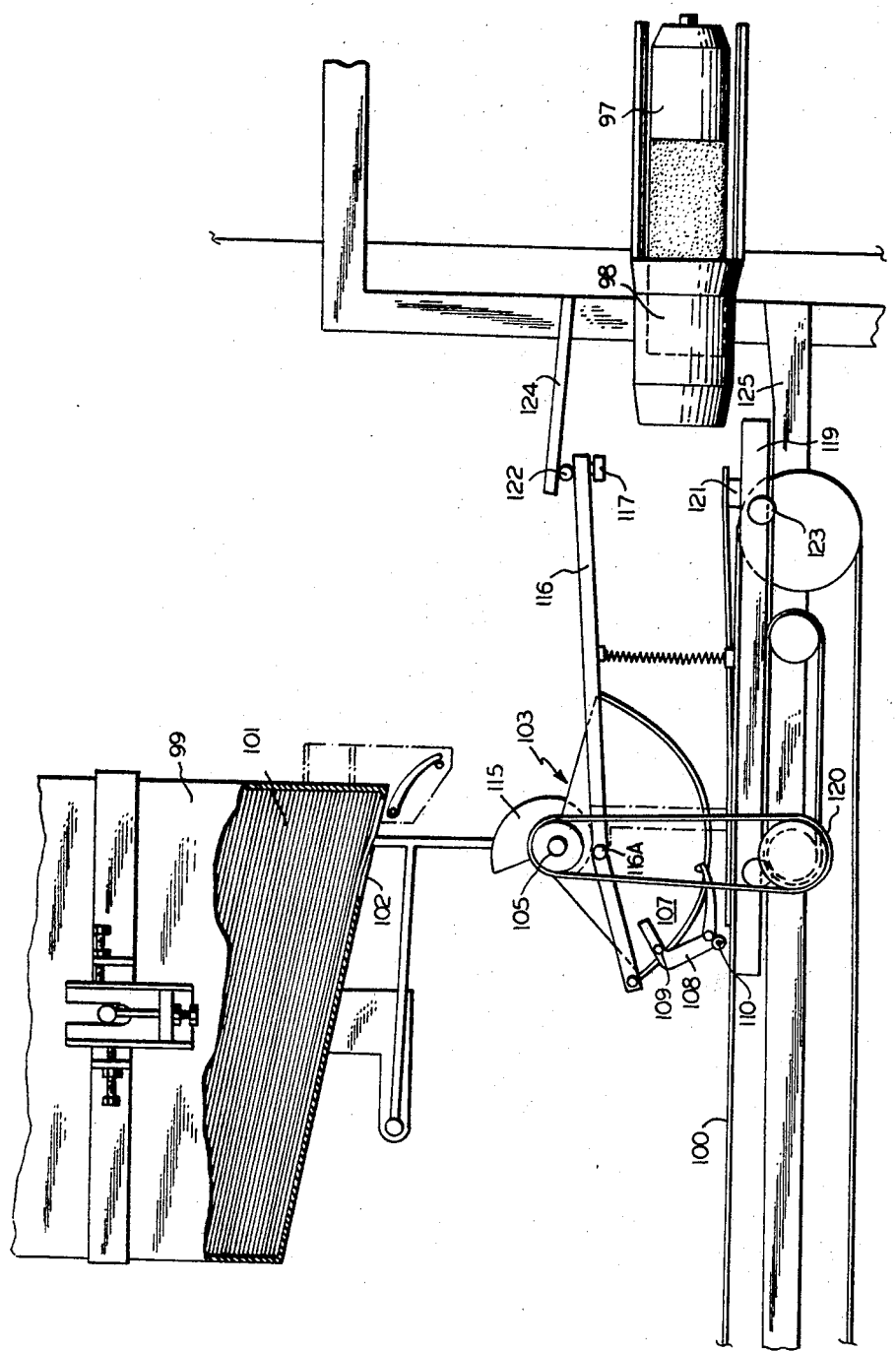

United States Patent Office 3,474,592
Patented Oct. 28, 1969

3,474,592
MACHINE FOR PRODUCING AND PACKAGING
DIAPERS
Hans Hessner, Djursholm, Sweden, assignor to Aktiebolaget Stille-Werner, Stockholm, Sweden
Continuation-in-part of application Ser. No. 448,667, Apr. 16, 1965. This application Apr. 8, 1968, Ser. No. 719,510
Claims priority, application Sweden, Apr. 20, 1964, 4,841/64
Int. Cl. A41h 43/00; B65b 9/06, 1/16
U.S. Cl. 53—112                     5 Claims

ABSTRACT OF THE DISCLOSURE

A machine for producing and packaging diapers having an outer envelope and an absorbent filling encased therein. Means withdraw cellulose tissue in the form of webs from storage rolls to form a layer of an absorbent pulp filler. Means fold an envelope web around such pulp layer with means for providing longitudinal and transverse seals on the envelope. The web is cut into desired lengths and the severed web portions are stacked in piles and packed in an outer wrapper. A suction box is provided having an upper surface formed by a horizontally running portion of a perforated endless belt enclosing the suction box with means for supplying lowermost and uppermost cellulose tissue webs at the entrance and exit ends of said horizontal portion of said endless belt. The means for supplying the absorbent pulp filler is located above said horizontal portion. A second suction box is located adjacent said first mentioned suction box having an upper surface formed by a horizontally running portion of an endless perforated belt with means at the entrance end of said second suction box for supplying to said last mentioned belt portion said outer envelope web and one more cellulose tissue web before said web layer from said first mentioned suction box is placed on said last mentioned belt portion.

---

This application is a continuation-in-part of my application Ser. No. 448,667, filed April 16, 1965, now abandoned, entitled "A Machine for Producing and Packaging Diapers."

The present invention relates to a machine for producing and packaging diapers of the kind consisting of an outer envelope of so-called non-woven material, preferably the material commercially available under the name Vonlinn, said envelope containing upper and lower plies of a cellulose tissue as well as an intermediate, highly absorbent layer of a pulp, i.e. a layer of ground or otherwise finely disintegrated mass of cellulose.

The object of the invention has been to provide a machine of the kind indicated having a very high capacity and capable of producing and packaging the diapers at a very low price, which is of course essential in view of the comparatively great consumption in each individual case. The invention has particularly for its object to provide a simple and extremely reliable machine of the type mentioned for which the requirements of operators have been reduced to an absolute minimum, and this is of almost decisive importance for the manufacturing price of the diapers. At the same time it has been important to take care that the above advantages are not obtained at the price of a poorer quality of the diapers, instead, an improved quality has been aspired to, especially as regards obtaining a uniform product easy to handle in use.

The invention will be explained in more details with reference to the accompanying drawings.

FIGURES 7 and 8 show details of the packaging unit in FIG. 6 in two different operative positions;

FIGURES 10 and 11 show on a slightly larger scale a side elevation of the part of the packaging unit in FIG. 9 used for supplying and opening the bags.

Figure 1:
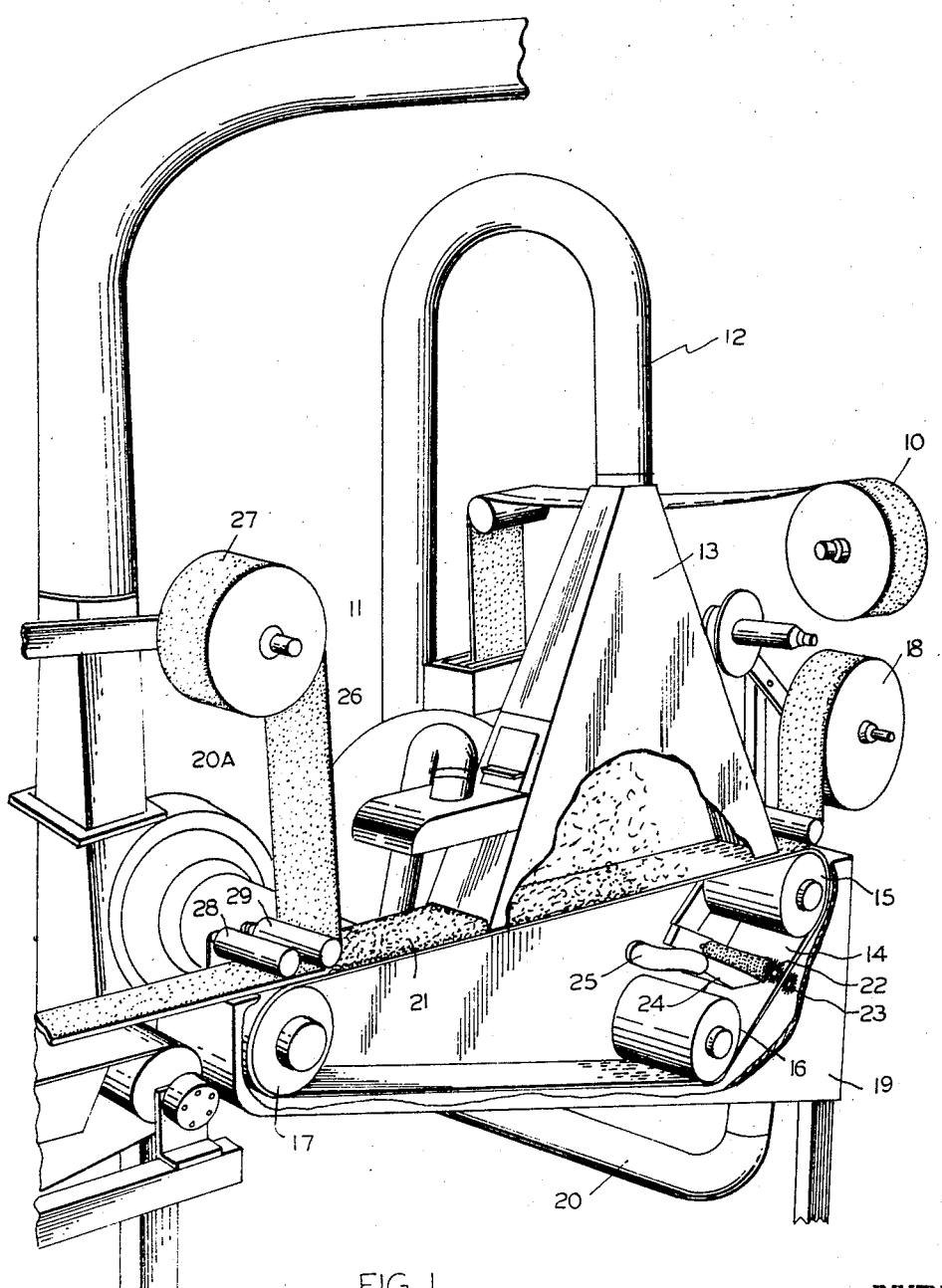
FIGURE 1 shows in perspective and partly in section a part of the machine adapted to supply pulp material and a couple of cellulose tissue webs included in the diapers.

In the machine shown as an example of the invention, a web of cellulose is supplied from a storage roll 10 to the inlet 11 of a disintegrator (not shown) of a kind known per se. From the disintegrator the pulp thus obtained is blown by means of a fan, not shown, through a pipe 12 into a downwardly directed funnel 13, the open lower end of which is located above an endless belt 14 running over rollers 15, 16 and 17 of which at least one is driven in a way not shown. The funnel 13 has substantially the same width as the belt 14 but extends along a rather substantial portion of its upper horizontal flight. Before the belt 14 runs in under the funnel 13, a web of cellulose tissue, possibly in two plies, is supplied to the upper horizontal flight of the belt from a storage roll 18. The greater part of the belt and the rollers 15, 16 and 17 around which the belt runs are disposed in a suction box 19 connected with a suction fan 20a through a pipe 20 and having its upper side formed by the horizontal flight of the endless belt 14. The belt 14 is perforated, it may consist of wire netting or the like, for instance, and owing to the overpressure in the funnel 13 and the underpressure in the suction box 19 the web of cellulose supplied from the storage roll 18 will be sucked against the top of the horizontal flight of the belt 14. Concurrently, the disintegrated pulp is supplied through the funnel 13 to the top of the tissue web and settles thereon in the form of a uniformly distributed layer running out from under the funnel 13 at its left edge in the drawing, as shown by the layer 21 in FIG. 1. Of course, the funnel edge has a corresponding opening so that the pulp layer 21 can get out from under the funnel.

It should be pointed out that the pressures in the suction box 19 and the funnel 13 as well as the air flows through them and through the associated pipes are dimensioned such that the pulp layer 21 is kept securely against the top surface of the tissue web on the belt 14.

To prevent clogging of the perforations of the belt 14, two brushes 22, 23 are disposed between the rollers 15 and 16, preferably in parallel to each other. Conveniently the brushes are driven, and adjacent the brushes 22, 23 there is a suction nozzle 24 for sucking off released particles or fine fibers of the pulp mass. Conveniently the suction pipe 25 connects the nozzle 24 to the same suction fan as the pipe 20.

When said pulp layer 21 has been formed on the web or webs of cellulose tissue, at least one further web of cellulose tissue, possibly in two plies, delivered from a storage roll 27 is supplied to the top surface of the layer 21. This upper tissue web runs under a pair of pulleys 28, 29 which keep the tissue web 26 in close contact with the layer 21. It should be mentioned that in parallel to the spindles of the storage rolls 10, 18 and 27 further spindles are provided to carry a spare storage roll so that a new storage roll is easily available when a previous roll has been consumed. As an alternative, it is possible to make these spindles vertical and of greater axial length so that the spindles can carry a number of storage rolls disposed one vertically above the other. In such case an appropriate number of pulleys must of course be provided to guide the webs in question into the machine in the correct way.

The arrangement just mentioned with the storage rolls disposed one vertically above the other is particularly advantageous with regard to the storage rolls 10 for cellulose pulp, as in practice these rolls are rather heavy and the consumption of cellulose pulp rather great. Such rolls are delivered from the mills in large packages, like ordinary newspaper rolls, and when using a vertical storage arrangement of the kind mentioned these large packages with several rolls may be introduced directly into the cycle of operations without having to be manually transferred to horizontally disposed spindles. Of course for this purpose a suitable turning table is necessary on which the large packages may be placed with their axes vertical, but as there are already several turning table constructions of proven design for various purposes, it will not be necessary to present any detailed description in this context.

Figure 2:
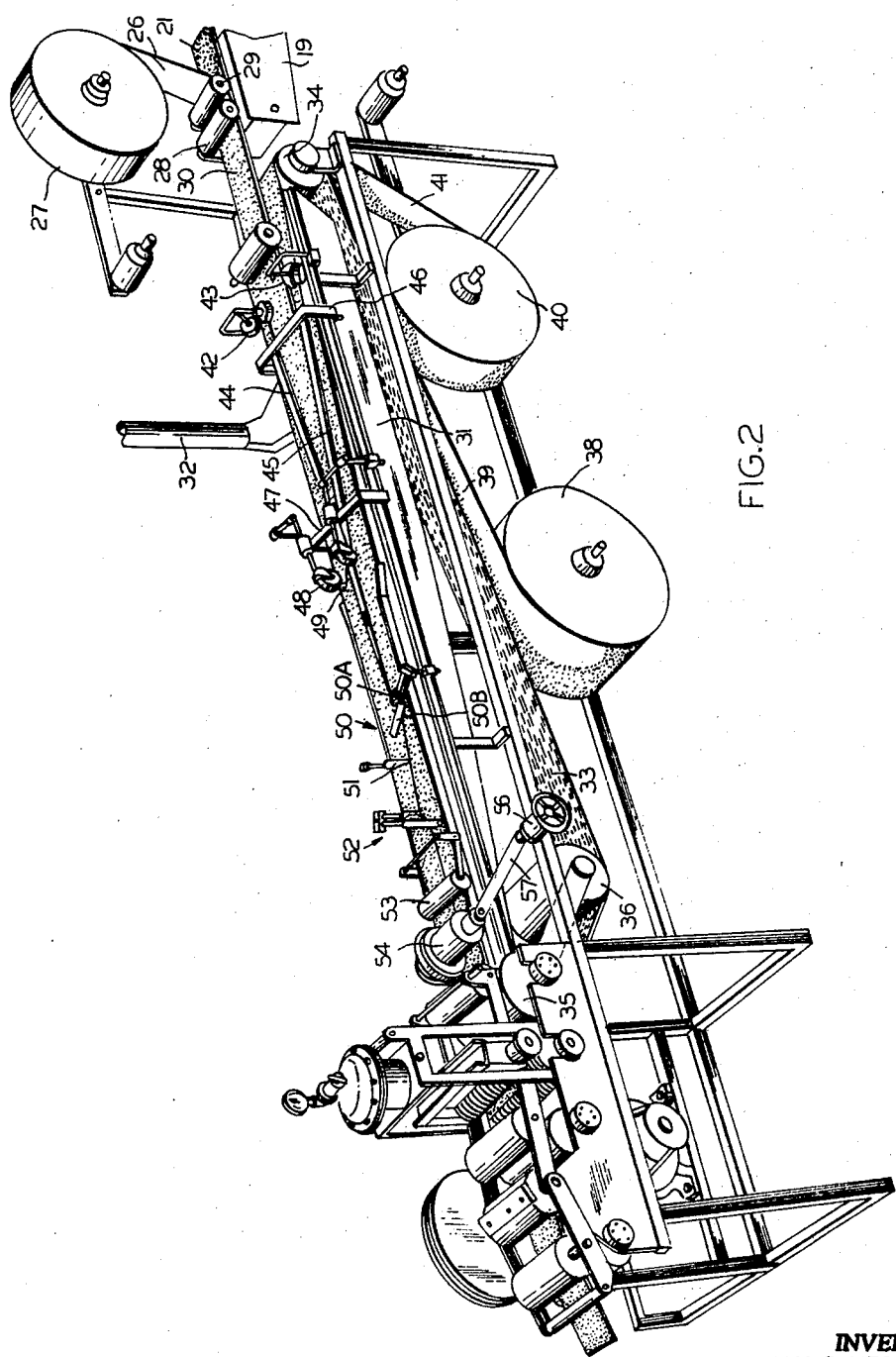
FIGURE 2 shows in perspective a part of the machine adapted to fold so-called non-woven material around the core of the diapers consisting of several plies and supplied in the form of a continuous web and to provide longitudinal and transverse seals on the envelope consisting of non-woven material as well as to cut continuous, transversely sealed diaper web into individual diapers.

The web unit thus obtained and consisting of at least one bottom web of cellulose tissue, an intermediate pulp layer and at least one top web of cellulose tissue is designated by 30 in FIG. 2. The web unit is conducted from the left end (in FIGS. 1 and 2) of the suction box 19 to a folding, sealing and cutting assembly shown schematically in FIG. 2. This assembly which, for greater simplicity, will hereinafter be called enveloping assembly, exhibits a suction box 31 connected with a suction fan through a pipe 32, possibly the same suction fan 20a providing the underpressure in the above-mentioned suction box 19.

The suction box 31 is open at the top and an endless perforated belt 33 guided over suitable rollers 34, 35 and 36 runs around it. Of these rollers 34, 35 and 36 at least one is driven as will be described in detail below, and preferably at least one roller is adjustably journalled to serve as tensioning roller for the endless belt 33. Similarly to the belt 14, the belt 33 may also consist of wire netting or the like. As described above, with reference to the suction box 19, the belt 33 forms a perforated top of the suction box 31 and of course the purpose thereof is, like in the assembly described with reference to FIG. 1, that the web unit 30 with the webs to be described below be kept in a well defined position during the continued treatment. A secondary, but nonetheless important purpose of the arrangement described is, moreover, to ensure that dust of pulp and cellulose tissue is removed to the greatest possible extent to keep the air around the machine free of dust which is, of course, essential not only with regard to the well-being of the operators but also with regard to the life and undisturbed operation of the machine.

A storage roll 38 with so-called non-woven material, of the kind commercially available under the name Bonlinn for instance, is disposed under the suction box 31. The web of this material designated by 39 and hereinafter called the envelope web runs around the pulley 34 at the intake end of the enveloping assembly, i.e. the right end in FIG. 2, and rests on the top surface of the perforated belt 33. To the right of the storage roll 38, FIG. 2 shows a further storage roll 40 disposed under the suction box 31 and containing another web 41 of cellulose tissue. This tissue web 41 likewise runs around the pulley 34 at the intake end of the enveloping assembly, on the outside of the enveloping web 39, and will thus be disposed on top of the latter.

The web unit 30 consisting of several plies and the web 41 of cellulose tissue have substantially equal widths and are positioned in the middle of the considerably wider envelope web 39 which initially lies flatly on the belt 33. Rather close to the pulley 34 a roller assembly 42 and 43 respectively is provided at either side of the multi-ply web travelling from right to left in FIG. 2. The purpose of these roller assemblies is to initiate the folding of the envelope web 39 around the narrower cellulose tissue-pulp web. Each roller assembly 42, 43 consists of two cooperating rollers, one having a concave and the other a convex peripheral envelope surface, said rollers being journalled on shafts disposed at an angle to each other and settable for purposes of adjustment in desired angular positions.

The roller assemblies 42, 43 just mentioned pull the edge portions of the envelope web 39 onto the top surface of two guide plates 44, 45 conveniently slightly arcuate in section and disposed at some distance above the perforated belt 33; conveniently they may be suspended in two brackets 46, 47. The guide plates 44, 45 converge upon each other in the direction of travel of said webs and therefore they permit the edges of the envelope web 39 to approach each other more and more to finally entirely encompass the multi-ply web unit 30 passing under the plates. To keep the edge portions well stretched around the guide plates 44, 45 during this operation so that no creasing occurs two wheels 48, 49 are journalled freely rotatable and the plane of rotation of these wheels form a small angle to the direction of movement of said edge portions on the guide plates 44, 45. These wheels 48, 49 which are adjustably supported on arms, are provided with suitable friction coatings and owing to their inclination they strive to pull the side edges of the envelope web 39 towards each other.

After the guide plates 44, 45 and the wheels 48, 49 in the direction of travel of the webs there is provided a roller assembly 50 consisting of two rollers disposed in parallel, viz. a roller 50A with a helically furrowed envelope surface and a roller 50B with an entirely smooth envelope surface. These rollers were disposed at an angle to the direction of travel of the webs and the pitch of the helical furrows is selected such that the edge portion of the envelope web 39 running between the rollers is well stretched around the multiply web unit 30. A conical pin or roller 51 is provided after the roller assembly 50 to hold the stretched edge portions of the envelope web 39, while the opposite edge portion is stretched by means of a roller assembly of a design similar to that of the roller assembly 50. As already mentioned, the two roller assemblies are similar but they constitute each other's mirror images, as shown in FIG. 2.

Figure 3:
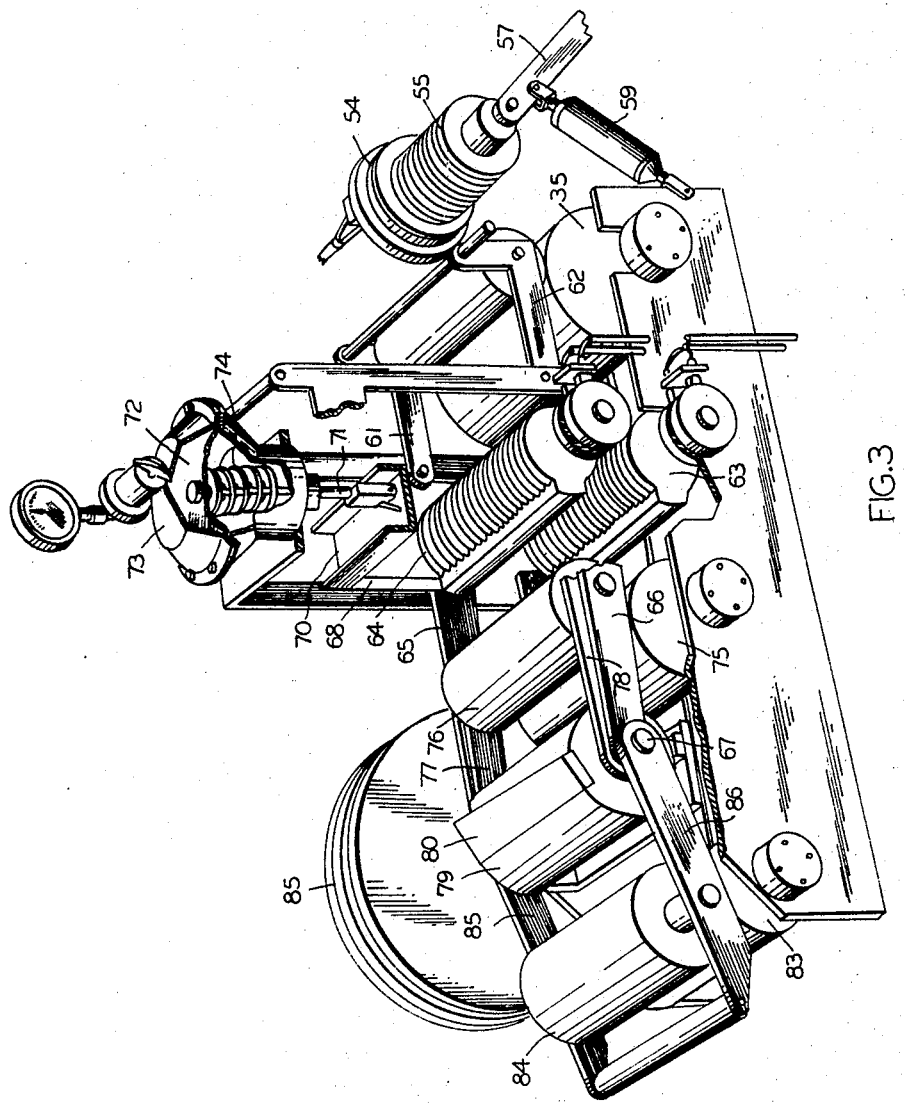
FIGURE 3 shows in perspective a part of the machine used for the transverse sealing and cutting of the diapers.

After the roller assembly 52 last mentioned there follows a pressure roller 53 which serves to hold together the individual webs in the positions stated above while they are being advanced to the sealing and tacking members to be described in detail with reference to FIGS. 3–5.

The web produced in the above manner may be said to consist of a continuous hose of envelope material with overlapping edges, said hose containing upper and lower webs of cellulose tissue with an intermediate layer of pulp.

To provide the required longitudinal seal over the overlapping edge portions of the envelope material a heat sealing disk 54 is rotatably disposed to roll against said edge portions, thus sealing them by heat and pressure in the way customary in connection with the heat sealing of thermo-plastic webs, for instance. Cooling flanges 55 are provided adjacent the heat sealing disk 54 to deduct surplus heat. Preferably the disk 54 is electrically heated, the heat effect conveniently being controlled by means of the adjustable transformer 56 indicated schematically in FIG. 2. The shaft of the heat sealing disk is pivotably journalled on two arms, 57, 58 so that the disk can be raised from the hose-shaped web in case of need, in connection with temporary interruptions of the operation, for instance. Conveniently, the disk in question is biased in the direction towards its operative position, e.g. by means of a pneumatic cylinder 59, as shown in FIG. 3 more specifically urged against the action of a restoring force, such as a restoring spring, not shown, for instance. This arrangement enables the heat sealing disk to be automatically raised from the hose-shaped web in case a disturbance or an intentional interruption of the operation occur.

After the heat sealing disk 54 there is provided a cooling and pressure roller 60 serving to cool the longitudinal seal of the web and to compress the seal simultaneously in cooperation with an underlying pulley 35. This cooling and pressure roller 60 is pivotably journalled in the frame by means of arms 61, 62.

After the longitudinal seal, uniformly spaced transverse seals are now provided on the hose-shaped web by means of heat and pressure. For this purpose there is a lower stationary but rotatably journalled roller 63 which may be designed as a counter-pressure roller solely or, if desired, may be designed as a heat sealing roller in that it is provided with a heat sealing disk 63A heated electrically, for instance, and having an axial length at least equal to the width of the hose-shaped web. A roller 64 which may be of the same basic design as the roller 63 is disposed above said roller 63 to cooperate therewith. The roller 64 is rotatably journalled in the ends of two levers 65 and 66 journalled pivotally around a shaft 67. The shaft of the roller 64 is likewise journalled in the lower ends of two arms 68, 69, projecting downwards from a horizontal yoke 70. The yoke is, in turn, connected to the lower end of a spindle 71 connected to a diaphragm 72 in a pressure box 73. The diaphragm is biased in upward direction by means of a pressure spring 74 to raise the spindle 71. Air is supplied to the pressure box 73 above the diaphragm 72 in its operable position to urge the roller 64 toward the lower counter-pressure roller 63. Each time an interruption of the operation occurs, the supply of air to the pressure box 73 is throttled, and the spring 74 causes the roller 64 to be raised from the counter-pressure roller and also from a web that may be lying between the rollers. Of course, the device may be designed such that the air pressure in the pressure box 73 is automatically released at every interruption of operation occurring in the machine.

The transverse seal having been thus provided, the web passes through a pair of pressure rollers, 75, 76 of which the latter is preferably journalled pivotably in the ends of two arms 77 and 78. The primary object of these two rollers is to prevent undesirable slips of the transversely sealed web during the cutting operation to be described below.

The cutting is carried out in the centre of the transversely sealed portions of the web by means of a knife roller 79 carrying a knife 80. Said knife 80 has an edge slightly inclined in relation to the axis of rotation of the roller and is adapted to cooperate with a firmly secured lower counter knife 81 which is adjustably secured to a strong holder 82. The knife 81 is of a design similar to that of the knife 80 and it will be appreciated that the cutting of the web is carried out approximately as with an ordinary pair of scissors. After the knife roller 79 two pressure rollers 83, 84 are provided of which the latter is preferably pivotably journalled in arms 85 and 86 in such a way that the roller 84 is pivotable around the shaft 67 in the same way as described with reference to the pressure roller 76. It should be mentioned that all the rollers 75, 76, 83, 84 are driven synchronously to the knife roller 79 to impart a positive guidance to the individual severed diapers during their entire travel through the machine.

Figure 4:
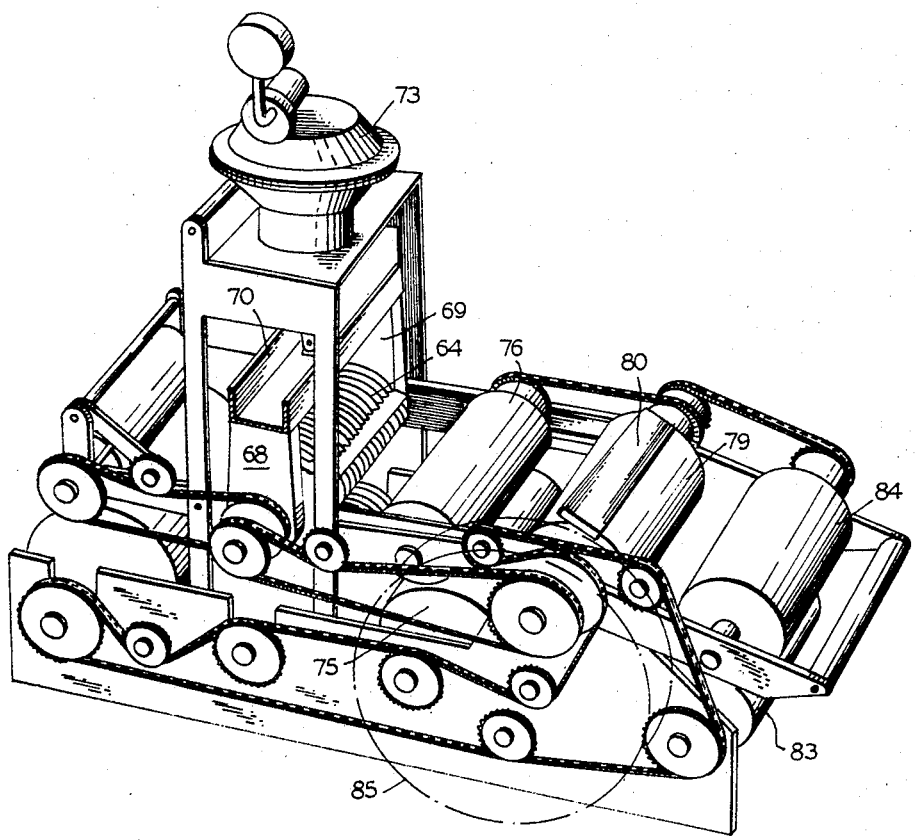
FIGURE 4 shows, likewise in perspective, the part shown in FIG. 3 but seen from the opposite side of the machine, various protective covers and the like having been omitted to show more clearly the driving of the different parts.

The driving of all the rollers and disks described is illustrated in perspective in FIG. 4 and it will be appreciated that all the rollers are driven such that their peripheral speeds are mutually alike. No detailed description of the interconnection of the individual rollers and disks will be necessary and it should only be mentioned that the driving power is supplied to the pulley 85 from a motor not shown and the shaft of the pulley is of course connected over suitable transmissions to all of said rollers and disks.

Figure 5:
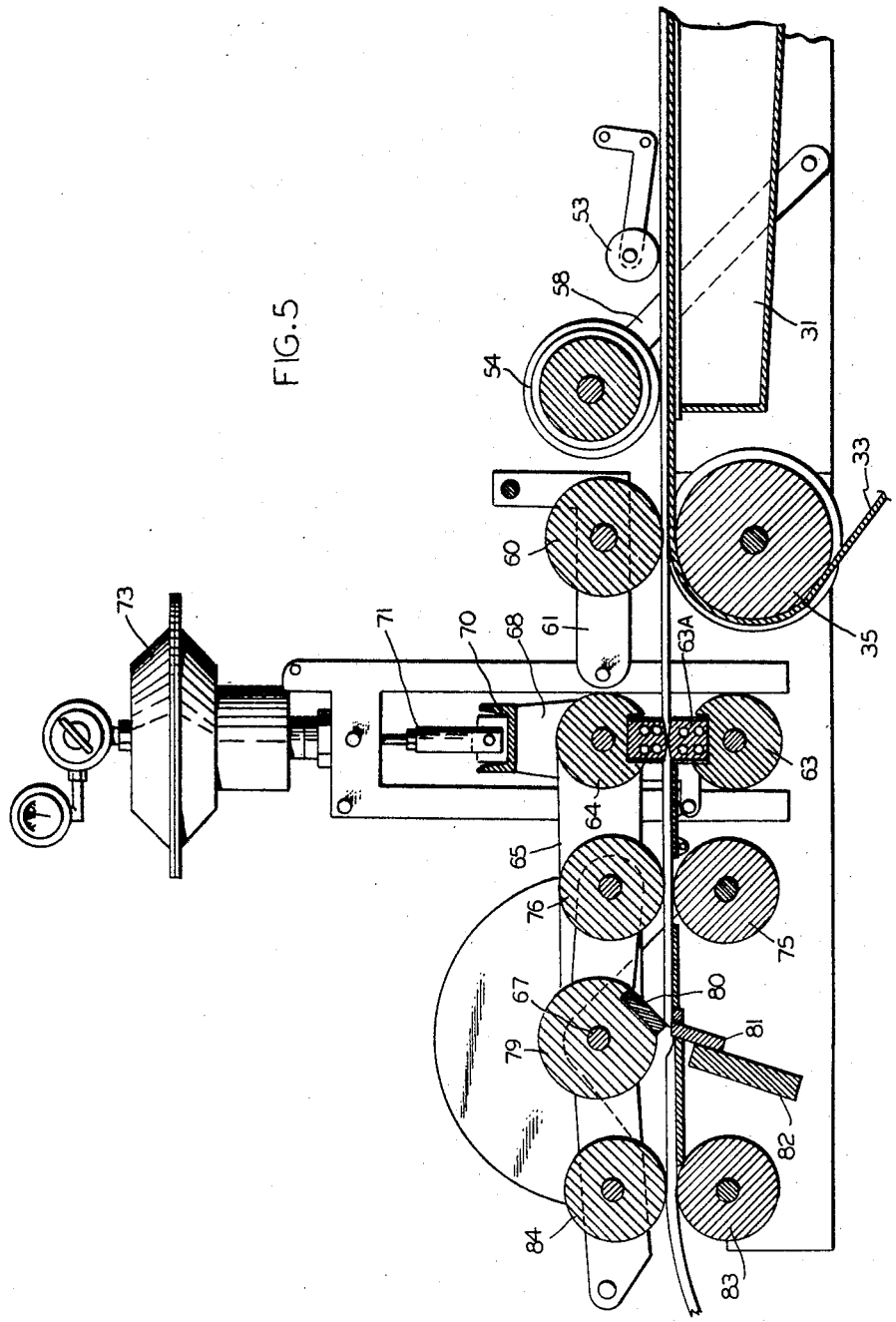
FIGURE 5 shows a vertical section of the part of the machine shown in FIGS. 3 and 4.

To the left in FIG. 5 is shown schematically a severed individual diaper being passed out between the rollers 83 and 84. It will be appreciated that diapers are discharged one after the other in very rapid succession and they are discharged into the packaging unit to be described in detain below and in which the diapers are first collected in groups of a desired number, 30 diapers, for instance, are then advanced to be packed in an outer wrapping, such as a bag or the like.

Figure 6:
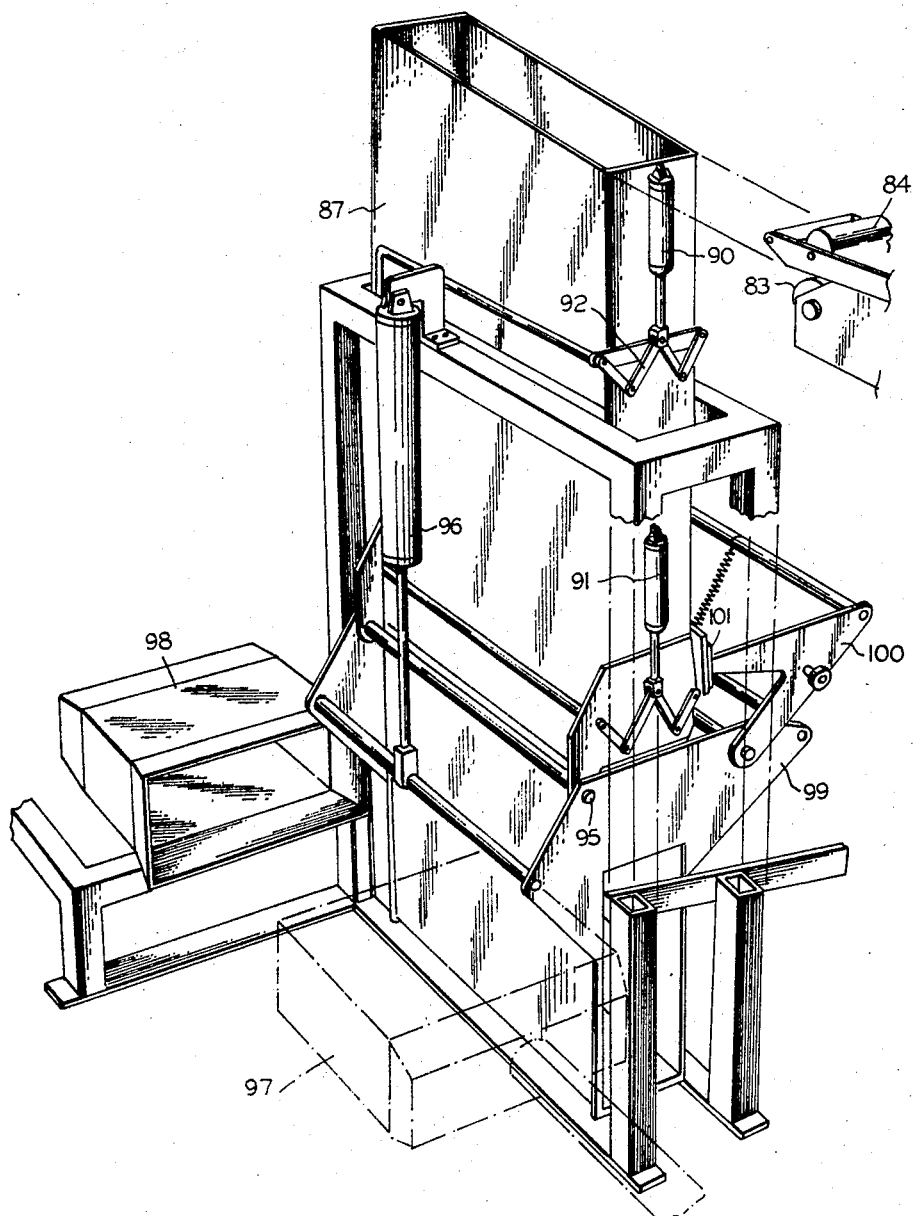
FIGURE 6 shows in perspective a packaging unit following immediately after the part shown in FIGS. 3–5 in the direction of travel of the web and adapted to temporarily store and collect the diapers in groups of a desired number to be packed in suitable wrappers, such as bags.

As mentioned, the diapers severed from each other are discharged one after the other in rapid succession between the rollers 83, 84, which are illustrated at the top and to the right in FIG. 6, and then the diapers are conducted over a guide not shown to the storing and grouping unit of the packing unit. This storing and grouping unit is shown in FIGS. 6, 7, and 8. It has a vertical shaft 87 in which the diapers are piled one on top of the other in a particular way as will be described in detail below. The shaft contains two groups of stop shutters 88 and 89 respectively which may be moved aside and are controlled each by means of a pneumatic cylinder 90 and 91, respectively, via appropriate linkages 92 and 93, respectively.

The lower shaft portion 94 may be swung aside around a shaft 95 as illustrated especially clearly in FIGS. 7 and 8 and the swinging movement is caused by means of a pneumatic cylinder 96. The shaft portion 94 is open at both its narrow sides in such a way that the piston 97 schematically indicated in FIG. 6 can push out a pile of diapers from the lower part of the magazine to a nozzle 98, when the magazine part in question has been swung aside in the manner shown in FIG. 8.

The storage and separating unit just described operates as follows. Let it be assumed that the shutters 89 are in their inner position and that the shutters 88 have been swung aside. Then a predetermined number, say 30, of diapers is collected on the bottom formed by the shutters 89. The diapers may be counted by means of optical, electrical, mechanical or any other means. At this stage, the lower shaft portion is in the position shown in FIGS. 6 and 7. When the desired number of diapers has been collected in the pile on the shutters 89, the latter are moved aside to drop the whole pile into the lower shaft portion 94. Simultaneously the shutters 88 are moved inwards so as to store temporarily the diapers supplied to the shaft 87 while the first pile is being discharged. When the first pile of diapers has passed the shutters 89 completely, these shutters may be returned to their closing position, the upper shutters 88 concurrently being moved aside to permit the passage of the diapers temporarily stored as described above.

Immediately following the filling of the lower shaft portion 94 with the pile of diapers, the pneumatic cylinder 96 is actuated to swing the lower shaft portion 94 from the position shown in FIG. 7 into the position shown in FIG. 8. During this movement a compresion member 100 pivotally journalled on flanges on the lower shaft portion 94 and having a compression plate 101 will be moved in through the open end of the lower shaft portion, i.e. the right end in FIG. 8. The compression member with compression plate 101 compresses the initially loosely packed pile of diapers in such a way that the pile is accomodated within the side openings in the narrow sides of the lower shaft portion 94. The lower shaft portion 94 having been moved laterally outwards as shown in FIG. 8 a pneumatic cylinder not shown will be actuated to move the piston 97 into the lower shaft portion 94, thus pushing the pile of diapers out of said lower shaft portion 94 and through the nozzle shown in detail in FIGS. 6 and 9. Thereupon the piston 97 is rapidly returned, and the pneumatic cylinder is actuated to swing the lower shaft portion 94 back into the vertical receiving position shown in FIG. 7. During the movement of the lower shaft portion 94 first laterally outwards and then back into the vertical receiving position the compression member 100 is automatically moved in relation to the lower shaft portion, either by means of a pneumatic cylinder or by suitable rollers or the like on the compression member 100 following conveniently design guides. When each individual pile of, in this case, 30 diapers, is advanced through the nozzle 98 and out therefrom, it is simultaneously pushed into a bag serving as wrapper, which has previously been slipped over the nozzle 98, as will now be described.

Figure 9:
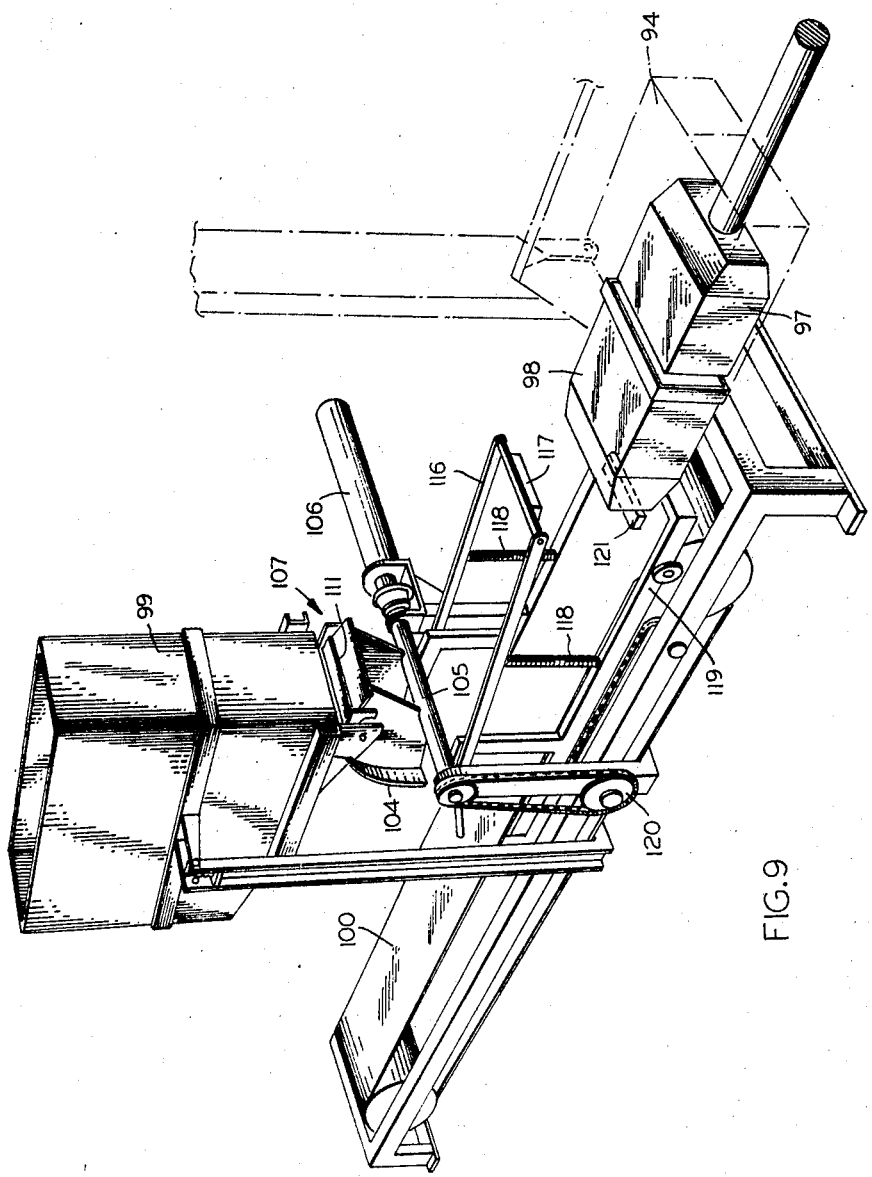
FIGURE 9 shows in perspective a further part of the packaging unit of the machine, viz. the one used for discharging the diapers into bags supplied from a magazine.

FIGS. 9–11 show a unit for applying an outer wrapper in the form of bags. The unit consists of a magazine 99 disposed above a belt conveyor 100 and containing a stock 101 of bags which may be withdrawn through a bottom opening 102 in the magazine by means of a withdrawing mechanism generally designated by 103. This withdrawing mechanism consists, for instance, of a sector-shaped drum 104 mounted on a shaft 105 that is pivotable back and forth by means of a motor 106 of a kind known per se. The drum carries a clamping device 107 consisting of two angular levers (cranks) 108 rotatably journalled on the drum by means of pivots 109. At least one of the cranks 108 carries at one end a cam roller 110, and the cranks 108 are interconnected by means of a connecting rod 111 located at the exterior of the drum 104. At least one but preferably both of the crank ends are biased by a pressure spring 112 in such direction that the cranks 108 strive to press the connecting rod 111 against the exterior of the drum. With reference to FIGS. 10 and 11, the unit for applying an outer wrapping just described functions such that the motor 106 first rotates the drum 104 anticlockwise into the position shown in FIG. 10. During this movement the cam roller 110 runs along the exterior of a pivotally journalled guide 113 and thereby the connecting rod 111 is lifted slightly from the exterior of the drum 104 so as to seize the nethermost bag in the magazine, as shown by the bag 101A in FIG. 10. When the cam roller has pased the guide 113, the double-armed levers are swung by the action of the spring 112 to clamp the connecting rod 111 against the exterior of the drum 104 and thus to clamp the bag against the drum. When the bag has been seized in this way the drum 104 is rotated clockwise in FIGS. 10 and 11 and the cam roller 110 lifts the guide 113 to be able to pass it. Then the guide returns into the position shown, by the action of a spring, for instance. When the drum 104 arrives in in the position shown in FIG. 11, the clamping device is again raised by the cam roller's running along a guide 114 of basically the same construction as the guide 113. Thereby the bag will be released by the clamping device and remains stationary with its bottom facing left in FIGS. 10 and 11.

The shaft 105 moves on, and by means of the cam 115 shown schematically in FIGS. 10 and 11 it will rotate an upper, pivotally journalled frame 116 clockwise around the shaft 116A. It is also possible to provide this rotary movement of the frame 116 by causing the drum 104 to impinge on the left end of the frame 116 in the course of its continued rotation on release of the bag and thereby to bring along the frame. The end of the frame 116 facing the nozzle 98 carried a nozzle 117 connected in a way not shown to a source of suction, and suitable springs 118 actuate the frame for rotary movement anticlockwise. The rotatable frame 116 is supported on a carriage 119 reciprocated by the transmission 120 shown schematically and having at its fore end a suction nozzle 121 similar to the nozzle 117 and disposed opposite thereto.

When the frame 116 is rotated clockwise, as mentioned, the suction nozzles 117 and 121 will seize the walls of a bag close to its orifice, and when the frame is then released to return under the action of the springs 118 the bag will, of course, be opened. Thereupon the whole carriage 119 is moved to the right in FIGS. 10 and 11, the bag being thereby slipped over the nozzle 98. During the movement of the carriage to the right, rollers 122 and 123 run along guide surfaces 124 and 125 on the frame of the machine, said guide surfaces converging slightly on each other, and thereby the walls of the bags will be clamped against the exterior of the nozzle 98 so that the bag is securely held while the pile of diapers is being introduced into it. When the pile of diapers has been introduced into the bag in the manner described, the still open package is moved to the left in FIGS. 9–11 on the belt conveyor 100 to be closed in some convenient way and, if desired, to be provided with some suitable kind of carrying strap.

It has been mentioned above that the pulp is obtained from a disintegrator not shown and particularly the kind operating with flails was thought of. However, it is also possible, in the assembly described above, to use a disintegrator of the brush type in which the pulp is so to speak brushed up from the cellulose web. This method of disintegration proceeds more smoothly and it is then possible to use a combination of strainer and vibrator to distribute the pulp on the supporting web. This means that a number of the sucking and blowing means otherwise required can be dispensed with and the whole machine assembly becomes considerably more noiseless and less dust-raising.

Of course, it lies within the scope of the invention to provide so-called distributing layers in convenient places to obtain a better distribution of the moisture to be absorbed by the diaper. For instance, it is possible to provide some kind of compression of certain portions of the diaper to ensure a better distribution of the moisture to be absorbed. For this purpose, one might use a diaper web three times as wide as the web described above and compress one edge portion along the web and/or stamp furrows therein in the longitudinal direction of the web. This web is then folded along two longitudinal folding lines, one edge portion overlapping the other so that the compressed and/or furrowed portion will be disposed in the centre of the unit thus folded. Thereby a considerably greater amount of absorbent material than before may be accommodated in the same volume so that a so-called "night-diaper" with great capacity of absorption is obtained without the diaper becoming thick and ungainly.

Further, it is within the scope of the inventive idea to provide the diaper with one or more plies of a nature to permit the passage of moisture more easily in one direction than in the other. It will thereby be possible to keep the moisture from contact with the skin so that the skin is spared and bacteria from the body are at the same time prevented from getting into contact with the moisture. Thereby it appears possible to prevent disagreeable odour to a considerable extent, because, as known, urine moistly smells disagreeably only when it has begun to ferment owing to body bacteria having penetrated into it, while otherwise urine is considerably less evil-smelling.

Further, non-woven material has been mentioned, but of course it is also within the scope of the invention to use other similar materials, such as webs entirely or for the major part consisting of particularly treater paper fibres, for instance. Further, it is possible within the scope of the invention to use a pulp-like mass to which fibres of some kind other than cellulose pulp has been added. Thereby it appears possible to obtain an improved springiness in the absorbent layer, and this is of great importance for the capacity of absorption.

Although not shown, it is a further object of the invention to make it possible, for particular purposes to provide the diapers produced by means of the machine assembly according to the invention with a supplementary web of plastic, for instance which is designed such that it may be unfolded and folded back to be wrapped directly around the child and constitute a "diaper-trouser." Alternatively, a portion of said web of non-woven material or the like may be replaced by a web, possibly perforated, of plastic or similar material.

A plurality of other modifications and alterations of details are also imaginable within the scope of the inventive idea.

What I claim is:

1. A machine for producing and packaging diapers consisting of an outer envelope and an absorbent filling comprising means for supplying an absorbent pulp filler by withdrawing cellulose tissue in the form of a web from a storage roll and disintegrating it into a layer of said absorbent pulp filler, means for forming an envelope web around said layer of pulp filler, means for providing longitudinal and transverse seals on said envelope web, means for cutting said envelope web with said filler into portions of desired lengths, means for stacking said portions in piles, said means for forming an envelope web around said pulp layer comprising a first suction box, a first perforated endless belt in said suction box, an upper surface in said first suction box formed by a horizontally running portion of said belt, means for supplying a lower and an upper cellulose tissue web at the entrance and exit ends to said first suction box of said horizontal portion of said endless belt, said means for supplying said absorbent pulp filler being located above said horizontal portion, a second suction box adjacent said first suction box, a second endless perforated belt, an upper surface in said second suction box formed by a horizontally running portion of said second endless perforated belt, means at the entrance end of said second suction box of said horizontally running portion of said second endless belt for supplying to said envelope web an outer envelope web and a cellulose tissue web before said envelope web from said first suction box enters said second suction box.

2. A machine as claimed in claim 1 wherein said means for supplying said outer envelope web comprises two guide plates slightly curved in cross-section disposed above said second perforated endless belt converging slightly in the direction of the movement of said webs, two roller assemblies disposed substantially centrally above said second suction box to draw up the edge portions of said outer envelope web around said guide plates, two freely rotatably journalled wheels above said guide plates which run on said edge portions and have their planes of rotation forming a small angle with the direction of the movement of the web on said guide plates.

3. A machine as claimed in claim 2 wherein each roller assembly comprises two cooperating rollers, one with a concave and one with a convex peripheral surface, said rollers being journalled on shafts disposed at an angle with respect to each other.

4. A machine as claimed in claim 2 wherein means are provided to arrange said edge portions of said outer envelope web in overlapping relation to each other.

5. A machine as claimed in claim 2 wherein said means for providing longitudinal and transverse seals comprises a rotatable heat sealing shoe for applying a longitudinal seam, two cooperating heat sealing shoes for applying transverse seams, and said cutting means comprises a rotary cutter means for cutting the web into separate diapers, and means for lifting said longitudinal sealing means and said transverse sealing means clear of said outer web.

References Cited

UNITED STATES PATENTS

| | | | |
|---|---|---|---|
| 1,971,064 | 8/1934 | Corlette | 53—124 |
| 2,618,814 | 11/1952 | Paton | 53—75 X |
| 2,680,943 | 6/1954 | Petersen | 53—123 |
| 2,789,406 | 4/1957 | Mosier | 53—123 X |
| 2,850,857 | 9/1958 | Broyles | 53—124 |
| 3,020,687 | 2/1962 | Joa | 53—123 X |
| 3,022,620 | 2/1962 | Gallet | 53—124 |
| 3,206,345 | 9/1965 | Stickel | 53—22 |
| 3,289,254 | 12/1966 | Joa | 128—290 X |
| 3,356,092 | 12/1967 | Joa | 128—290 X |

WAYNE A. MORSE, JR., Primary Examiner

U.S. Cl. X.R.

53—22, 121, 123, 124; 128—284, 290, 296